United States Patent
Chang

(10) Patent No.: US 9,937,661 B2
(45) Date of Patent: Apr. 10, 2018

(54) STORAGE ELECTRIC SEALER

(71) Applicant: Welcome Co., Ltd., New Taipei (TW)

(72) Inventor: Richard Chang, New Taipei (TW)

(73) Assignee: WELCOME CO., LTD., New Taipei (TW)

( * ) Notice: Subject to any disclaimer, the term of this patent is extended or adjusted under 35 U.S.C. 154(b) by 51 days.

(21) Appl. No.: 15/011,868

(22) Filed: Feb. 1, 2016

(65) Prior Publication Data

US 2016/0229115 A1 Aug. 11, 2016

(30) Foreign Application Priority Data

Feb. 5, 2015 (TW) .............................. 104103871 A

(51) Int. Cl.
*B29C 65/22* (2006.01)
*B29C 65/74* (2006.01)
*B29C 65/00* (2006.01)
*B65B 51/14* (2006.01)
*B29L 31/00* (2006.01)

(52) U.S. Cl.
CPC .......... *B29C 65/222* (2013.01); *B29C 65/228* (2013.01); *B29C 65/745* (2013.01); *B29C 66/1122* (2013.01); *B29C 66/43121* (2013.01); *B29C 66/8161* (2013.01); *B29C 66/81821* (2013.01); *B29C 66/8221* (2013.01); *B29C 66/8324* (2013.01); *B29C 66/8618* (2013.01); *B65B 51/146* (2013.01); *B65B 51/148* (2013.01); *B29C 66/71* (2013.01); *B29L 2031/7128* (2013.01)

(58) Field of Classification Search
CPC ....... B29C 65/00; B29C 65/18; B29C 65/222; B29C 65/223; B29C 65/228; B29C 66/7352; B29C 66/8161; B29C 66/8324; B29C 66/8618; B29C 66/818; B29C 66/1122; B29C 66/232; B29C 66/43121; B29C 66/8167; B29C 66/81821; B26B 29/00; B26B 27/00; B65B 51/148; Y10T 156/18; B26D 1/025; B29L 2031/7128
USPC ............ 219/243, 227; 156/579, 583.1, 583.9
See application file for complete search history.

(56) References Cited

U.S. PATENT DOCUMENTS 4,329,197 A * 5/1982 Robles .................... B29C 65/18
126/231
4,504,353 A * 3/1985 Ford .................... B29C 66/1122
100/2

(Continued)

*Primary Examiner* — Dana Ross
*Assistant Examiner* — Joe E Mills, Jr.
(74) *Attorney, Agent, or Firm* — Bacon & Thomas, PLLC

(57) ABSTRACT

A storage electric sealer comprises a casing, a sealing module, a spring switch, a support cover, a press bar, and a sliding plate. The casing and the sealing module are arranged on the casing. The support cover includes at least two containing grooves. The press bar provided with a sliding chute is pivotally connected with the pivoting holder of the casing. The sliding plate is provided with a heat insulation block and at least a stopper, both lateral side of the sliding plate being connected with the sliding chute of the press bar in a sliding manner. Wherein, the sliding plate is located at a closed position in storage state, so that the stopper is accommodated in the containing groove of the support cover. As such, the storage electric sealer can be transformed into a storage state by a modified sliding mechanism to reduce the volume and damage rate effectively.

8 Claims, 5 Drawing Sheets

(56) References Cited

U.S. PATENT DOCUMENTS

| | | | | |
|---|---|---|---|---|
| 4,680,081 A * | 7/1987 | Hamisch, Jr. | ........... | B41J 25/304 101/288 |
| 5,374,806 A * | 12/1994 | Chou | ....................... | B29C 65/18 219/227 |
| 5,641,418 A * | 6/1997 | Chou | ....................... | B29C 65/18 219/227 |
| 5,854,466 A * | 12/1998 | Chou | ....................... | B29C 65/18 156/579 |
| 6,064,038 A * | 5/2000 | Chou | ................... | B29C 66/0044 219/227 |
| 6,232,579 B1 * | 5/2001 | Chou | ................... | B29C 66/8161 219/227 |
| 6,326,594 B1 * | 12/2001 | Chang | ................ | B29C 66/0044 219/227 |
| 6,328,086 B1 * | 12/2001 | Takahashi | ............. | B65C 11/004 156/362 |
| 6,335,515 B1 * | 1/2002 | Chou | ..................... | B29C 66/225 219/227 |
| 6,573,477 B1 * | 6/2003 | Chang | ................ | B29C 66/8614 219/227 |
| 6,881,929 B2 * | 4/2005 | Hovorka | ............. | B29C 66/1122 156/311 |
| 6,936,790 B1 * | 8/2005 | Chou | ................. | B29C 66/8161 219/227 |
| D542,315 S * | 5/2007 | Chang | ......................... | D15/146 |
| 7,377,087 B2 * | 5/2008 | Clarke | ................... | B65B 31/08 53/434 |
| D579,034 S * | 10/2008 | Chang | ......................... | D15/146 |
| 7,759,611 B2 * | 7/2010 | Cheney | ................. | B29C 65/229 156/229 |
| 2001/0000608 A1 * | 5/2001 | Chang | ................ | B29C 66/0044 219/243 |
| 2002/0070206 A1 * | 6/2002 | Chou | .................... | B29C 66/225 219/243 |
| 2003/0141092 A1 * | 7/2003 | Petak | ....................... | H02G 3/12 174/66 |
| 2004/0144766 A1 * | 7/2004 | Chang | .................... | B29C 65/18 219/243 |
| 2004/0262281 A1 * | 12/2004 | Chou | ..................... | B29C 65/18 219/243 |
| 2006/0231211 A1 * | 10/2006 | Chou | .................... | B29C 65/228 156/579 |
| 2006/0254219 A1 * | 11/2006 | Alipour | ................... | B29C 65/18 53/434 |
| 2008/0314888 A1 * | 12/2008 | Chang | ................ | B29C 66/0044 219/240 |
| 2009/0020230 A1 * | 1/2009 | Chang | .................... | B26B 27/00 156/579 |
| 2009/0026190 A1 * | 1/2009 | Chang | .................... | B26B 27/00 219/243 |
| 2014/0109511 A1 * | 4/2014 | Hammad | ............ | B29C 66/8324 53/79 |
| 2015/0027089 A1 * | 1/2015 | Owens | ................ | B29C 66/8324 53/510 |

\* cited by examiner

STORAGE ELECTRIC SEALER

BACKGROUND OF THE INVENTION

1. Field of the Invention

The present invention relates to a storage electric sealer, and more particularly, to a storage electric sealer adapted for sealing a plastic bag or plastic slice material.

2. Description of Related Art

Currently there are a variety of small, lightweight portable electric sealers on the market. In recent years, various manufacturers for prior art also have plenty of improved technologies, such as TW Patent Publication No. M394289 called "improved structure of an electric sealer". As shown in FIG. 7, a perspective view of an electric sealer according to the prior art. The electric sealer 9 mainly includes a casing 92, a main support cover 951, a front support cover 952 and a rear support cover 953 both engaged with the casing 92, and a press bar 97 pivotally connected with the casing 92, wherein, a rotatable extension module 96 is disposed at the bottom of the casing 92. The extension module 96 is a blade module. Besides, electricity of the electric sealer is provided by a battery, and will be transformed into heat output by using a sealing module 93 while the sealing process proceeds.

However, after using a conventional electric sealer, there is a gap between the press bar 97 and the casing 92, and the press bar 97 can't be engaged thoroughly with the casing 92 so that the conventional electric sealer may occupy a larger volume. As a result, the sealing module 93 may be initiated easily by a user without cautious resulting from an exposed sealing module 93, so that the heat does harm to a user and waste the non-essential energy. Moreover, the smaller the volume of the electric sealer is occupied, the more cost on the transportation or storage can be decreased in mass production. To solve the above-mentioned problem, persistent research and experiments for "a storage electric sealer" has been undertaken, eventually resulting in accomplishment of the present invention.

SUMMARY OF THE INVENTION

The object of the present invention is to provide a storage electric sealer, which is not only convenient to use as a traditional portable electric sealer, but also transformed into a storage state by a modified sliding mechanism after using so as to reduce the volume and damage rate effectively.

To achieve the object, there is provided a storage electric sealer, which comprises a casing, a sealing module, a spring switch, a support cover, a press bar and a sliding plate. The casing includes two front contact slots, a rear contact slot, a battery chamber and a pivoting holder thereon, the two front contact slots being arranged with a front contact, and the rear contact slot being arranged with at least a rear contact; the sealing module is arranged on the casing; the spring switch is arranged on the casing; the support cover includes at least two containing grooves and engaged in the casing; the press bar is provided with a sliding chute and pivotally connected with the pivoting holder of the casing; and the sliding plate is provided with a heat insulation block and at least a stopper, both lateral side of the sliding plate being connected with the sliding chute of the press bar in a sliding manner; wherein, the sliding plate is located at a closed position in storage state, so that the stopper is accommodated in the containing groove of the support cover. As such, the storage electric sealer comprises a sliding mechanism, by which the stopper can be moved to a containing groove, so that the shape of the storage electric sealer will become a cuboid.

Otherwise, the sliding plate is located at an open position in usage state, so that the stopper is away from the containing groove of the support cover, and the heat insulation block is corresponding to the sealing module of the casing. As such, when sealing process going, the heat insulation block of the sliding plate pushes against the corresponding sealing module of the casing, so that a plastic bag could be sealed successfully. At that time, there is a gap between the press bar and the casing, and the press bar is provided with an inclined angle.

In addition, the sealing module of the present invention may include a heat insulation base, a heating portion and a front spring. The heating portion is disposed on the heat insulation base, and the front spring is arranged between the heat insulation base and the front loader of the casing; a protrusion of the heat insulation base is inserted in a hole of the front support cover.

The spring switch of the present invention may be an elastic member or a safety switch, wherein the elastic member includes a push bar and a rear spring, and the rear spring is accommodated in the rear loader, being used for pushing between the push bar and the casing; the push bar is inserted in a hole of the rear support cover. The safety switch is an electronic switch or other equivalence element, restricting the sealing module in the open circuit when the spring switch isn't pressed by a user.

The sliding plate of the present invention further comprises an extension module. The extension module can be a blade module, including a blade and combined parts for engaging the blade. Also, the blade can be a safety blade, which can be ceramics material, steel sheet . . . or other equivalent material.

The support cover of the present invention may comprise a main support cover, a front support cover and a rear support cover, which are individual parts and engaged in the casing. Preferably, the main support cover, the front support cover and the rear support cover also can be formed integrally.

At least two containing grooves of the present invention may include three containing grooves, which is a first containing groove, a second containing groove and a third containing groove, when the sliding plate is located at the closed position, the heat insulation block will be accommodated in the first containing groove, the extension module will be accommodated in the second containing groove, and the stopper will be accommodated in the third containing groove; when the sliding plate is located at the cutting position, the extension module will be corresponding to the cutting point.

Other objects, advantages, and novel features of the invention will become more apparent from the following detailed description when taken in conjunction with the accompanying drawings.

DETAILED DESCRIPTION OF THE PREFERRED EMBODIMENT

Figure 1:
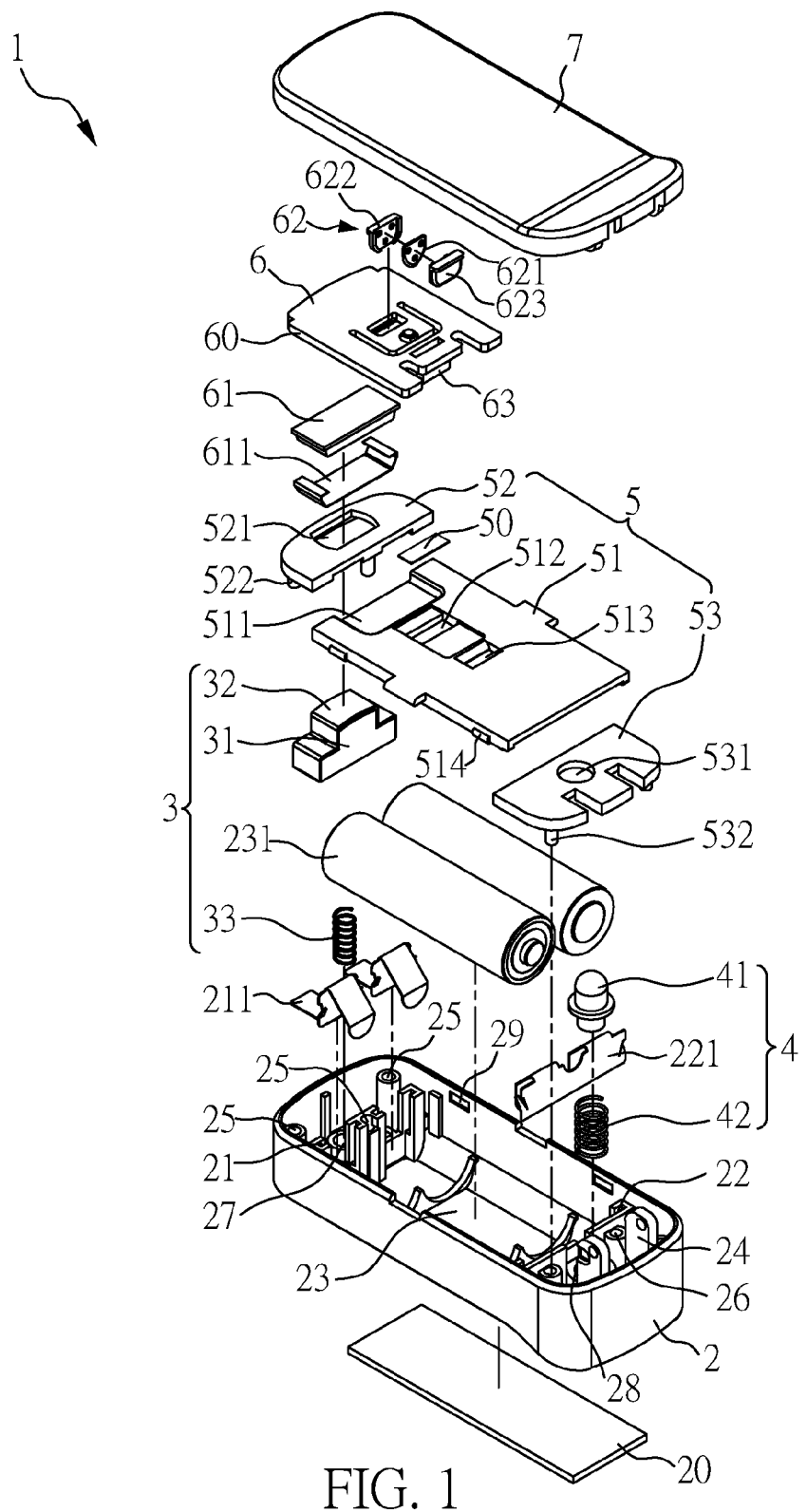
FIG. 1 is an exploded view of a storage electric sealer according to a first embodiment of the present invention.
Figure 2:
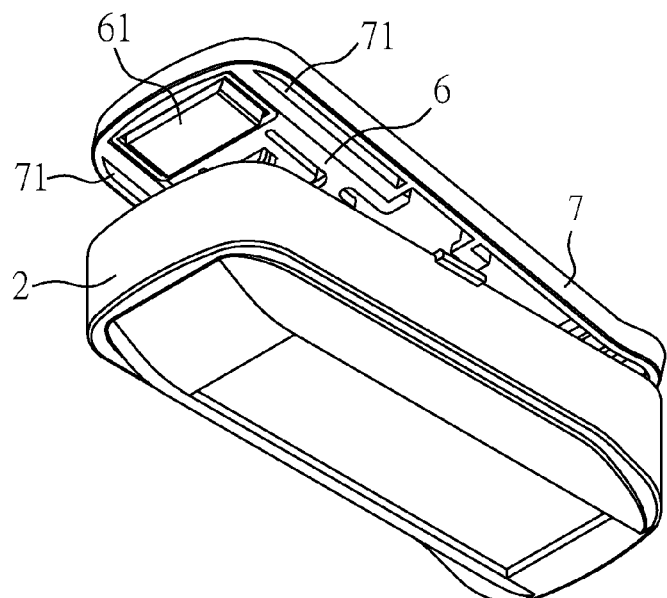
FIG. 2 is a perspective view of a storage electric sealer according to the first embodiment of the present invention.

Referring to FIGS. 1 and 2, an exploded view and a perspective view of a storage electric sealer according to a first embodiment of the present invention. As shown in FIGS. 1 and 2, a storage electric sealer 1 includes a casing 2, a sealing module 3, a spring switch 4, a support cover 5, a sliding plate 6 and a press bar 7.

As shown in FIG. 1, the casing 2 is provided underneath with a casing magnet 20, and having two front contact slots 21 and a rear contact slot 22, which is located on two opposite sides of a battery chamber 23. Wherein, two front contacts 211 are inserted in both front contact slots 21 respectively, and a rear contact 221 is inserted in the rear contact slot 22 so as to feed the electrical power from the battery 231 located in the battery chamber 23 by means of a circuit loop. Moreover, three front mounting holes 25 and a front loader 27 are arranged at the front end of the front contact slots 21; relatively, two rear mounting holes 26, a rear loader 28 and a pivoting holder 24 are arranged at the rear end of the rear contact slot 22. Furthermore, four locking holes 29 are arranged on the sides of the casing 2. All the front mounting holes 25, rear mounting holes 26 and four locking holes 29 are directly clamped with the support cover 5.

The sealing module 3 comprises a heat insulation base 31, a heating portion 32 and a front spring 33. The heating portion 32 is disposed on the heat insulation base 31, having a heating wire (not shown) which is disposed on the surface of the heat insulation base 31 and being electrically connected with the two front contacts 211. The front spring 33 is arranged between the heat insulation base 31 and the front loader 27 of the casing 2. In addition, electrical power of the battery 231 in the battery chamber 23 can be conducted to the heating wire by the two front contacts 211 and the rear contact 221. Thereby, electrical power can be transformed into heat energy in the circuit loop of the storage electric sealer 1.

Then, the embodiment of the present invention further includes a spring switch 4, which is an elastic member, including a push bar 41 and a rear spring 42. The rear spring 42 is accommodated in the rear loader 28, and is used for pushing between the push bar 41 and the casing 2. Also, the spring switch 4 can be a safety switch, so that users have to press both the heating portion 32 of the sealing module 3 and the push bar 41 of the spring switch 4 to start sealing function. Therefore, users have no chance to get scalded because of mistakenly touching the sealing module 3.

Referring to FIG. 1, the support cover 5 includes a main support cover 51, a front support cover 52 and a rear support cover 53. The main support cover 51 has three containing grooves on the top surface, including a first containing groove 511, a second containing groove 512 and a third containing groove 513, and the main support cover 51 is correspondingly clamped in the four locking holes 29 of the casing 2 by using four locking parts respectively; the front support cover 52 is provided with a hole 521, where a protrusion of the heat insulation base 31 is inserted, and the front support cover 52 is correspondingly clamped in the three mounting holes 25 of the casing 2 by using three front mounting part 522; besides, the rear support cover 53 is provided with a hole 531, where a protrusion of the push bar 41 is inserted, and the rear support cover 53 is correspondingly clamped in the two rear mounting holes 26 of the casing 2 by using two rear mounting part 532. As such, each part of the support cover 5 can be clamped with the casing respectively, so that users can easily remove the support cover 5 in order to refill or disengage the battery 231, and put the support cover 5 back later on.

Furthermore, referring to FIG. 1 and FIG. 2, the press bar 7 is pivotally connected with the pivoting holder 24 of the casing 2, and having a sliding chute 71; a heat insulation block 61 is fixedly connected on the sliding plate 6, and a heat insulation cover sheet 611 is disposed on the top surface of the heat insulation block 61 in order to be a heat protection. Besides, two side edge of the sliding plate 6 is connected in the sliding chute 71 of the press bar 7 in a sliding manner, sliding back and forth linearly along the sliding chute 71. In the embodiment, the storage electric sealer 1 is provided with not only the heat insulation block 61, but also an extension module 62 and a stopper 63, wherein, extension module 62 is a blade module, including a first combined part 622, a blade 621 and a second combined part 623. The blade 621 is arranged between the first combined part 622 and the second combined part 623 to be formed a combination, so that plastic products could be cut by the blade 621 in a good manner. In addition, the blade 621 is a ceramics safety blade, which can also be ceramics material, steel sheet . . . or other equivalent material. Moreover, at least two position holes (not shown) are disposed on bottom of the press bar 7, restricting the sliding distance of the sliding plate 6 and helping for positioning the location. The stopper 63 is disposed on the sliding plate 6, and can be correspondingly stored in the third containing groove 513 of the main support cover 51 when the sliding plate 6 is located at a closed position. In summary, the heat insulation block 61, the extension module 62 and the stopper 63 are arranged from front end to rear end of the sliding plate 6 in sequent. when the sliding plate 6 is located at the closed position, the heat insulation block 61 will be accommodated in the first containing groove 511 of the main support cover 51, the extension module 62 will be accommodated in the second containing groove 512 of the main support cover 51, and the stopper 63 will be accommodated in the third containing groove 513; when the sliding plate 6 is located at the cutting position, the extension module 62 will be corresponding to the cutting point 50.

Figure 3:
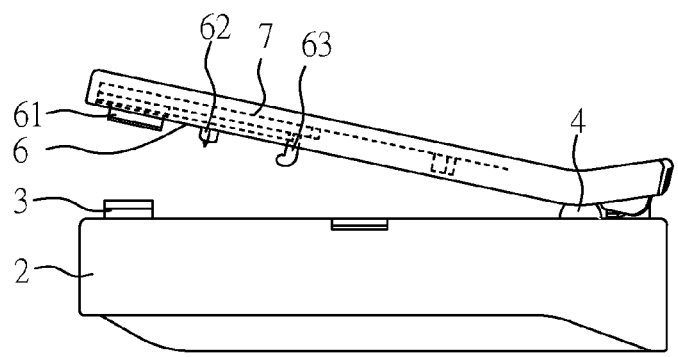
FIG. 3 is a side view of usage state of a storage electric sealer according to the first embodiment of the present invention.
Figure 4:
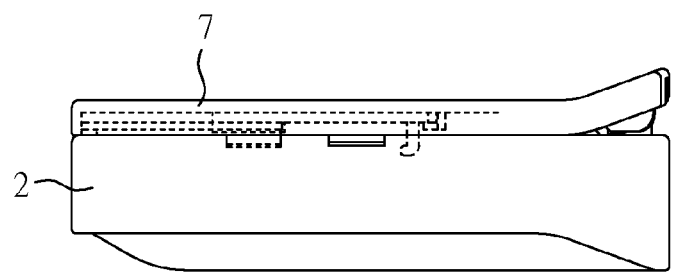
FIG. 4 is a side view of storage state of a storage electric sealer according to the first embodiment of the present invention.

Referring to FIG. 3 and FIG. 4, a side view of usage state and storage state of a storage electric sealer according to a first embodiment of the present invention. As shown in FIG. 3, the sliding plate 6 is located at an open position in usage state, where the sliding plate 6 slides forward so that the position of the sliding plate 6 is corresponding underneath to the heat insulation base 31, so the stopper 63 will move away from the first containing groove 511 of the support cover 5; on the contrary, as shown in FIG. 4, the sliding plate 6 is located at a closed position in storage state, so that the heat insulation block 61 is accommodated in the first containing groove 511 and the stopper 63 is accommodated in the third containing groove 513 of the main support cover 51. Wherein, the extension module 62 and the stopper 63 is accommodated in the second containing groove 512 and third containing groove 513 of the main support cover 51 respectively, so that the press bar 7 and casing 2 will be tightly closed in the form of a cuboid, which reduces the volume and damage rate effectively. Besides, the sliding plate 6 is located at a cutting position in cutting state (not shown), so that the extension module 62 is corresponding to the cutting point 50 of the main support cover 51 in order to finish cutting function.

Figure 5:
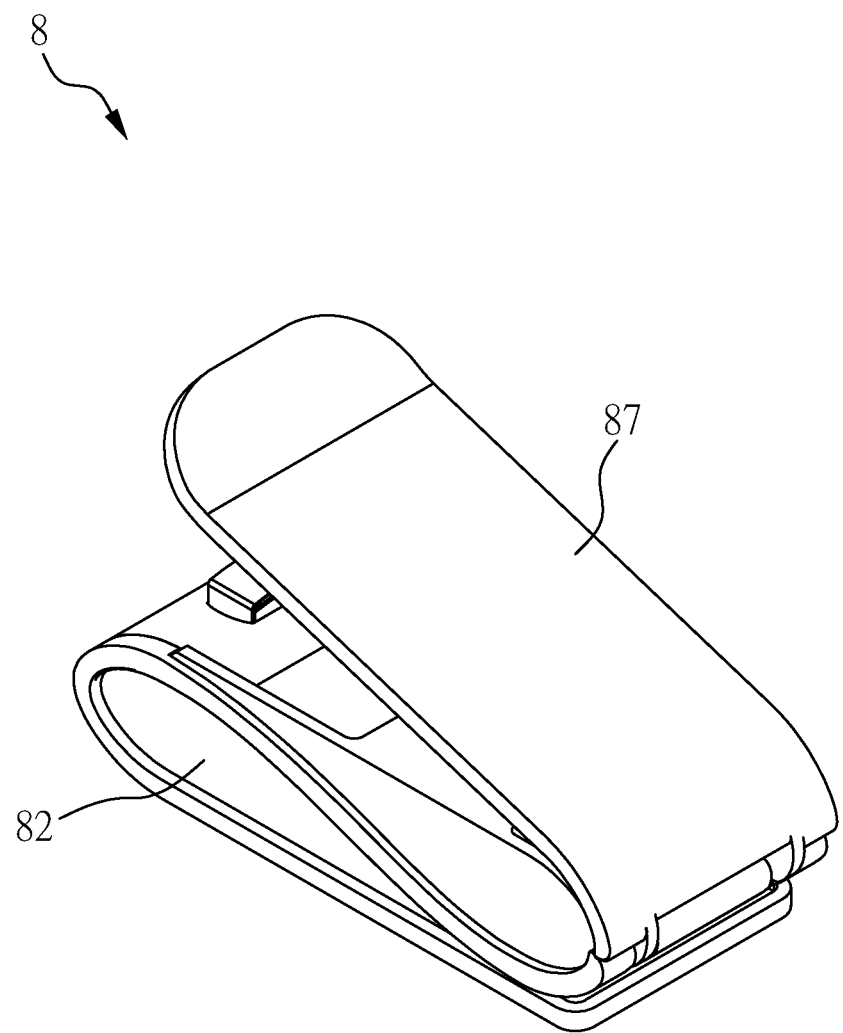
FIG. 5 is a perspective view of a storage electric sealer according to a second embodiment of the present invention.
Figure 6:
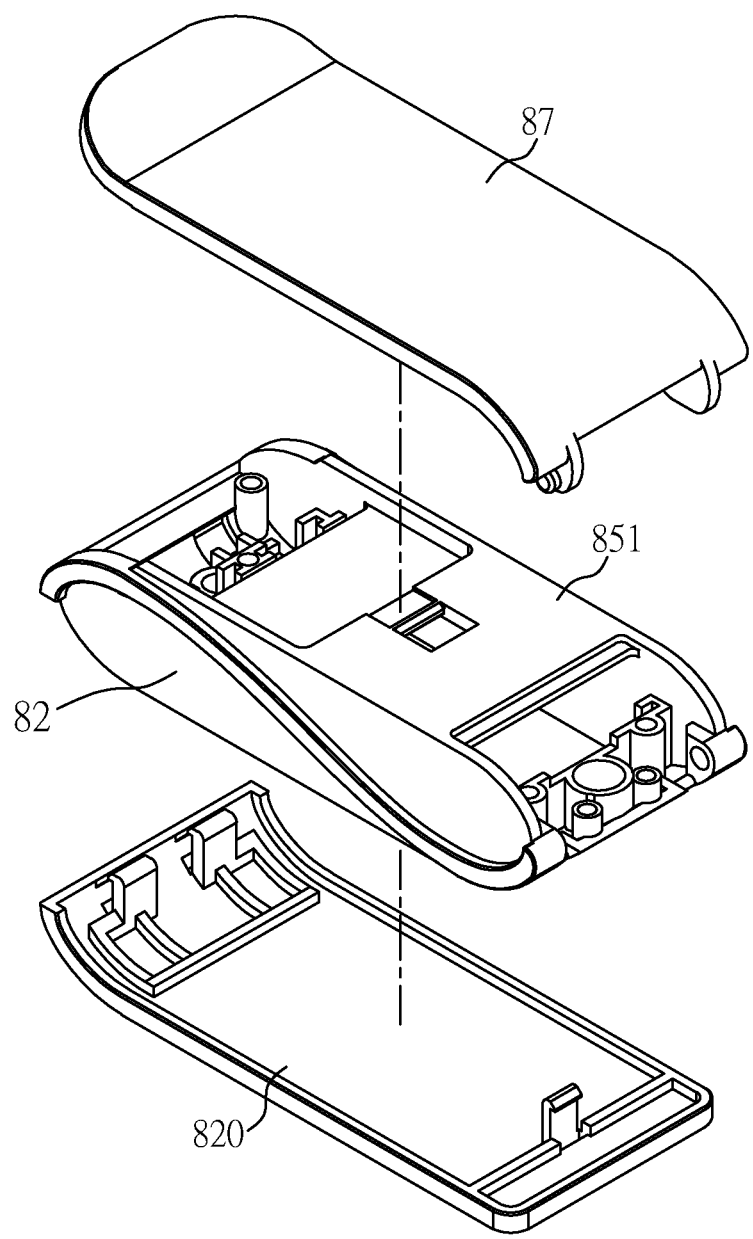
FIG. 6 is a exploded view of a casing and a press bar according to the second embodiment of the present invention.
Figure 7:
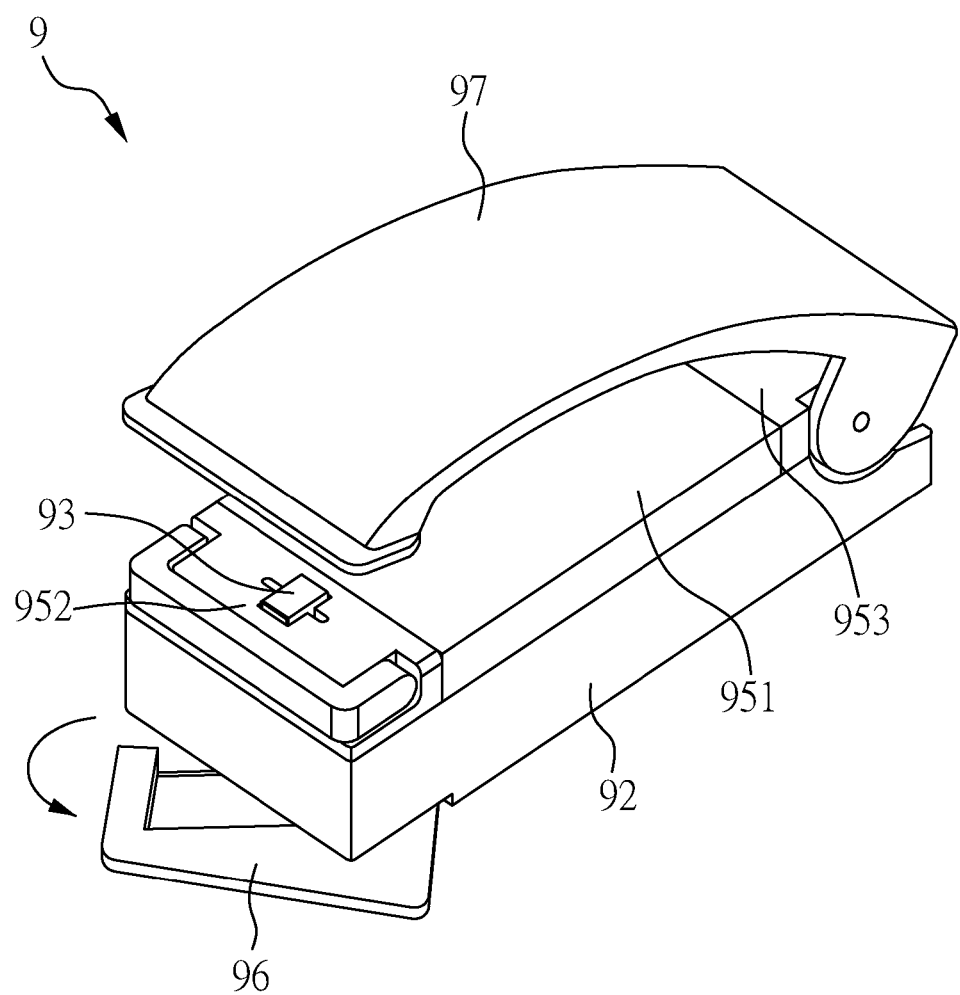
FIG. 7 is a perspective view of an electric sealer according to the prior art.

Referring to FIG. 5 and FIG. 6, a perspective view of a storage electric sealer, and an exploded view of a casing and a press bar according to a second embodiment of the present invention. Structure of the storage electric sealer 8 in the second embodiment is approximately the same as that in the first embodiment, so the main different between two embodiments is focused on the shape of a casing 82, a bottom bar 820, and a press bar 87, which puts more fashion style thereon. Besides, the casing 82 and the main support cover 851 are formed integrally, so the battery should be picked and placed from the back side, which provides an new style comparing to the structure of the first embodiment. Therefore, the support cover of the present invention can be not only formed separately, but also formed integrally.

Although the present invention has been explained in relation to its preferred embodiment, it is to be understood that many other possible modifications and variations can be made without departing from the spirit and scope of the invention as hereinafter claimed.

What is claimed is:

1. A storage electric sealer, comprising:
   a casing, including two front contact slots, a rear contact slot, a battery chamber and a pivoting holder thereon, the two front contact slots being arranged with a front contact, and the rear contact slot being arranged with at least a rear contact;
   a support cover, including at least two containing grooves and engaged in the casing;
   a sealing module, arranged between the casing and the support cover;
   a spring switch, arranged between the casing and the support cover;
   a press bar, provided with a sliding chute and pivotally connected with the pivoting holder of the casing; and
   a sliding plate, provided with a heat insulation block and at least a stopper, both lateral sides of the sliding plate being slidably connected with the sliding chute of the press bar and moving along the sliding chute;
   wherein, the sliding plate slides along the sliding chute and is located at a closed position, where the stopper and the heat insulation block are accommodated in the containing groove of the support cover when the press bar covers on the casing in a storage state.

2. The storage electric sealer as claimed in claim 1, wherein the sliding plate further includes an extension module, which is a blade module and is arranged next to the stopper, and the blade module includes a first combined part, a blade, and a second combined part.

3. The storage electric sealer as claimed in claim 2, wherein the sliding plate slides along the sliding chute and is located at an open position, where the stopper is away from the containing groove of the support cover and the heat insulation block is corresponding to the sealing module when the press bar covers on the casing in usage state.

4. The storage electric sealer as claimed in claim 1, wherein the sealing module includes a heat insulation base, a heating portion and a front spring.

5. The storage electric sealer as claimed in claim 1, wherein the spring switch is an elastic spring in order to provide restoring force to the press bar.

6. The storage electric sealer as claimed in claim 1, wherein the support cover comprises a main support cover, a front support cover and a rear support cover, which are engaged in the casing, wherein the main support cover includes at least two containing grooves.

7. The storage electric sealer as claimed in claim 3, wherein the support cover includes three containing grooves, which is a first containing groove, a second containing groove and a third containing groove, when the sliding plate is located at the closed position, the heat insulation block will be accommodated in the first containing groove, the extension module will be accommodated in the second containing groove, and the stopper will be accommodated in the third containing groove.

8. The storage electric sealer as claimed in claim 1, wherein the casing is provided underneath with a casing magnet, so that the storage electric sealer is able to be mounted on metal furniture.

* * * * *